(12) United States Patent
Liu et al.

(10) Patent No.: US 7,941,332 B2
(45) Date of Patent: May 10, 2011

(54) APPARATUS, SYSTEM, AND METHOD FOR MODELING, PROJECTING, AND OPTIMIZING AN ENTERPRISE APPLICATION SYSTEM

(75) Inventors: Te-Kai Liu, Irvine, CA (US); Danny Nan Tang, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 1502 days.

(21) Appl. No.: 11/342,421

(22) Filed: Jan. 30, 2006

(65) Prior Publication Data

US 2007/0219944 A1    Sep. 20, 2007

(51) Int. Cl.
*G06F 17/30* (2006.01)

(52) U.S. Cl. ................................. 705/7

(58) Field of Classification Search ............ 705/8, 7
See application file for complete search history.

(56) References Cited

U.S. PATENT DOCUMENTS

| | | | |
|---|---|---|---|
| 5,031,089 A | 7/1991 | Liu et al. | 709/226 |
| 5,799,173 A | 8/1998 | Gossler et al. | 703/21 |
| 5,899,986 A | 5/1999 | Ziauddin | 707/2 |
| 5,960,423 A | 9/1999 | Chaudhuri et al. | 707/2 |
| 6,029,163 A | 2/2000 | Ziauddin | 707/2 |
| 6,460,122 B1 * | 10/2002 | Otterness et al. | 711/154 |
| 6,574,605 B1 | 6/2003 | Sanders et al. | 705/8 |
| 6,606,585 B1 | 8/2003 | Borowsky et al. | 703/2 |
| 6,631,354 B1 * | 10/2003 | Leymann et al. | 705/8 |
| 6,631,422 B1 * | 10/2003 | Althaus et al. | 709/250 |
| 6,636,905 B1 | 10/2003 | McNamer et al. | 710/15 |
| 6,691,067 B1 | 2/2004 | Ding et al. | 702/186 |
| 6,895,585 B2 | 5/2005 | Smith | 718/103 |
| 6,910,061 B2 | 6/2005 | Hu et al. | 709/202 |
| 6,957,211 B1 * | 10/2005 | Tyulenev et al. | 707/718 |
| 7,028,302 B2 * | 4/2006 | Kiick | 718/105 |
| 2004/0078782 A1 | 4/2004 | Clement et al. | 717/116 |
| 2007/0083500 A1 * | 4/2007 | Zibitsker | 707/3 |

* cited by examiner

*Primary Examiner* — Romain Jeanty
(74) *Attorney, Agent, or Firm* — Kunzler Needham Massey & Thorpe (57) ABSTRACT

An apparatus, system, and method are disclosed for modeling and optimizing an enterprise application system. The apparatus, in one embodiment, is configured to determine the system processing capacity and workload characteristics. The apparatus is further configured to determine optimization parameters, including the system processor utilization, minimum job acquiring rates for data entry points of the system, and software component multi-parallelism recommendations. A method is disclosed, in one embodiment, to report the optimization parameters and to implement the optimization parameters within the system during run-time.

37 Claims, 6 Drawing Sheets

302 Job throughput benchmark

| Job throughput benchmark | Data |
|---|---|
| Benchmark job processing rate | 1000 jobs/second |
| Number of processors | 8 |
| Time for an individual processor to process a benchmark job | 0.008 seconds |

304, 306

308 Workload characteristics

| Name | Type | Expected volume | Complexity value | SW component usage list | SOC value (Time window) | Throughput confidence value |
|---|---|---|---|---|---|---|
| W1 | Event-triggered | 1,000,000 | 1.0 | C1,C4,C5,C8,C9,C10 | 8AM-8PM | 99.90% |
| W2 | Event-triggered | 2,000,000 | 2.0 | C1,C4,C5,C8,C10 | 10AM-10PM | 99.50% |
| W3 | Batch-triggered | 3,000,000 | 1.5 | C2,C4,C6,C11 | 9PM-12AM | N/A |
| W4 | Batch-triggered | 4,000,000 | 1.0 | C2,C4,C7,C12 | 11PM-2AM | N/A |
| W5 | Call-triggered | 5,000,000 | 0.5 | C3,C13 | 6AM-8PM | 99.99% |

310, 312, 314, 316, 318, 320, 322

324 System operating conditions

| SOC | SOC value list | Executing workloads |
|---|---|---|
| A | 6AM-8AM | W5 |
| B | 8AM-10AM | W1,W5 |
| C | 10AM-8PM | W1,W2,W5 |
| D | 8PM-9PM | W2 |
| E | 9PM-10PM | W2,W3 |
| F | 10PM-11PM | W3 |
| G | 11PM-12AM | W3,W4 |
| H | 12AM-2AM | W4 |
| I | 2AM-6AM | None |

326, 328, 330

332 Entry point associations

| WL | Associated data entry point |
|---|---|
| W1 | EP1 |
| W2 | EP1 |
| W3 | EP2 |
| W4 | EP2 |
| W5 | EP3 |

| Processor utilization values | | | | | | |
|---|---|---|---|---|---|---|
| SOC | Condition | Executing workloads | u% | | Workload complexity adjusted job arrival rate | ~502 |
| A | 6AM-8AM | W5 | 6.9% | W1 | 39*1=39 | |
| B | 8AM-10AM | W1,W5 | 10.8% | W2 | 64*2=128 | |
| C | 10AM-8PM | W1,W2,W5 | 23.6% | W3 | 370*1.5=555 | |
| D | 8PM-9PM | W2 | 12.8% | W4 | 370*1=370 | |
| E | 9PM-10PM | W2,W3 | 68.3% | W5 | 138*0.5=69 | |
| F | 10PM-11 PM | W3 | 55.5% | | | |
| G1 | 11 PM-11:15 PM | W3,W4 | 92.5% | | | |
| G2 | 11:15 PM-12AM | W4 | 37.0% | | | |
| H | 12AM-2 AM | W4 | 37.0% | | | |
| I | 2AM-6AM | None | 0.0% | | | |

504  506  508  510  512  514

| C10 multi-parallelism requirements | | | | | |
|---|---|---|---|---|---|
| | Workload, SOC | | | | |
| Parameter | W1, B | W1, C | W2, C | W2, D | W2, E |
| arwi | 39 | 39 | 64 | 64 | 64 |
| bt | 0.008 | 0.008 | 0.008 | 0.008 | 0.008 |
| compwi | 1.0 | 1.0 | 2.0 | 2.0 | 2.0 |
| dwicj | 10/36 | 10/36 | 10/28 | 10/28 | 10/28 |
| u% - SOCk | 10.8% | 23.6% | 23.6% | 12.8% | 68.3% |
| itwicjsocK | 0.5 | 0.5 | 0.5 | 0.5 | 0.5 |
| c10 multi-parallelism value | 19.6 | 19.6 | 32.5 | 32.4 | 33.2 |

APPARATUS, SYSTEM, AND METHOD FOR MODELING, PROJECTING, AND OPTIMIZING AN ENTERPRISE APPLICATION SYSTEM

BACKGROUND OF THE INVENTION

1. Field of the Invention

This invention relates to computing system planning and optimization, and more particularly relates to enterprise application planning and optimization.

2. Description of the Related Art

Enterprise application software is a computer program or collection of computer programs designed to consolidate and process information for an enterprise. Some common examples of enterprise application software are enterprise resource planning systems (ERP), customer relationship management systems (CRM), and enterprise application integration systems (EAI). Many enterprise application systems are custom built.

The performance of an enterprise application is critical because delays in one aspect can affect other aspects of the enterprise. However, the task of projecting and optimizing performance for an enterprise application is very complicated as the enterprise application often must handle many different types of workloads, and different types of workloads may have different optimization goals. The different types of workloads share the same hardware and operating system resources, and in some cases they share the same software components within an enterprise application.

Some of the possible workload types are synchronous and asynchronous, call-triggered, event-triggered, and batch-triggered. One set of goals may be to minimize response time for call-triggered workloads, and to prevent processor over-utilization for batch-triggered workloads. Synchronous and asynchronous workloads are general categories, and the other workload types will be either synchronous or asynchronous. A synchronous workload consists of jobs such that each job has a request and a reply message. An example of a synchronous job might be a request from a company web site. An asynchronous workload consists of jobs with one-way communication or processing. An example of an asynchronous job might be a record of the daily loading of sales orders from CRM into an accounting system.

Call-triggered workloads, which are usually synchronous, are sent by a requesting program or device, and the requestor must know how to compile the request message, how to send the request, where to expect the request response, and how to interpret the response once it arrives. For example, a math program may have a shared function on the server, and whenever the program needs the function, it configures a request, calls the server, awaits the returned answer, and interprets the answer.

Event-triggered workloads, which are usually asynchronous, have a different characteristic. The occurrence of events and the processing of events usually happen independently. An even may occur in one system but is needed in another system. One or more programs are responsible for detecting, fetching, and transporting these events from the system where the events occur to the system where the events are needed. For example, a purchase order arriving from a trading partner via electronic data interchange (EDI) may be an event-triggered job that needs to be sent from the EDI inbox to the order processing system.

Batch-triggered workloads are scheduled workloads where all the jobs of the entire workload arrive at approximately the same moment. For example, refreshing all product information of a web store from the catalog system might be a batch-triggered workload where all products arrive at the web store at approximately the same time. Batch-triggered jobs are usually asynchronous.

The current methods of handling these complexities involve using experience with specific systems, applying an iterative trial-and-error optimization, making educated guesses at optimization parameters, and over-designing systems to ensure that enough processing capability is available for the application. This is because there is not yet a systematic understanding of the input variables that affect enterprise application system workload optimization, and the methodology to optimize these systems does not exist. The current state of the art leaves enterprise application systems vulnerable to system outages, slow response, and/or resource under-utilization.

From the foregoing discussion, it should be apparent that a need exists for an apparatus, system, and method to model enterprise application system workloads, to project resource utilization for such systems, and to determine optimization parameters for such systems. Beneficially, such an apparatus, system, and method would also allow implementation of the optimized parameters.

SUMMARY OF THE INVENTION

The present invention has been developed in response to the present state of the art, and in particular, in response to the problems and needs in the art that have not yet been fully solved by currently available enterprise application system modeling methods. Accordingly, the present invention has been developed to provide an apparatus, system, and method for modeling and optimizing enterprise application systems that overcome many or all of the above-discussed shortcomings in the art.

In one aspect of the invention, an apparatus for providing enterprise application performance modeling and optimization information includes a benchmark module which receives information relating to the processing capacity available to the enterprise application, and which receives workload characteristics describing various workloads which the enterprise application services. In one embodiment, the apparatus also includes a job arrival module configured to calculate expected job arrival rates for the various workloads, and minimum job acquiring rates for data entry points associated with the workloads. The apparatus also includes, in one embodiment, a processor utilization module configured to determine the processor utilization projection for the processing capacity available to the enterprise application. The apparatus may further include a multi-parallelism module configured to determine a multi-parallelism recommendation for software components, based on the processing capacity available to the enterprise application, the processor utilization projection, and the expected job arrival rates. The apparatus may also include a reporting module to report the data optimization information.

In another aspect of the invention, a system is presented to model and optimize enterprise software. In one embodiment, the system includes workload providers that send workloads to the enterprise application, a central processor, an enterprise application, and a memory device which determines and reports the optimization information.

The memory device, in one embodiment, is configured to determine the system workload information, the system processing capacity information, and to calculate modeling and optimization information. In one embodiment, the modeling and optimization information includes processor utilization information, minimum job acquiring rate information, and multi-parallelism information for software components.

In another aspect of the invention, a method of the present invention is also presented for modeling and optimizing enterprise application software. The method in the disclosed embodiments substantially includes the steps necessary to carry out the functions presented above with respect to the operation of the described apparatus and system. In one embodiment, the method includes receiving processor capacity information and workload characteristics. The method may also include calculating a processor utilization projection, a multi-parallelism recommendation for software components, and a minimum job acquiring rate. In a further embodiment, the method includes reporting the optimization information. In one embodiment, the method may also include changing parameters in the enterprise application during run-time based upon the optimization information.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
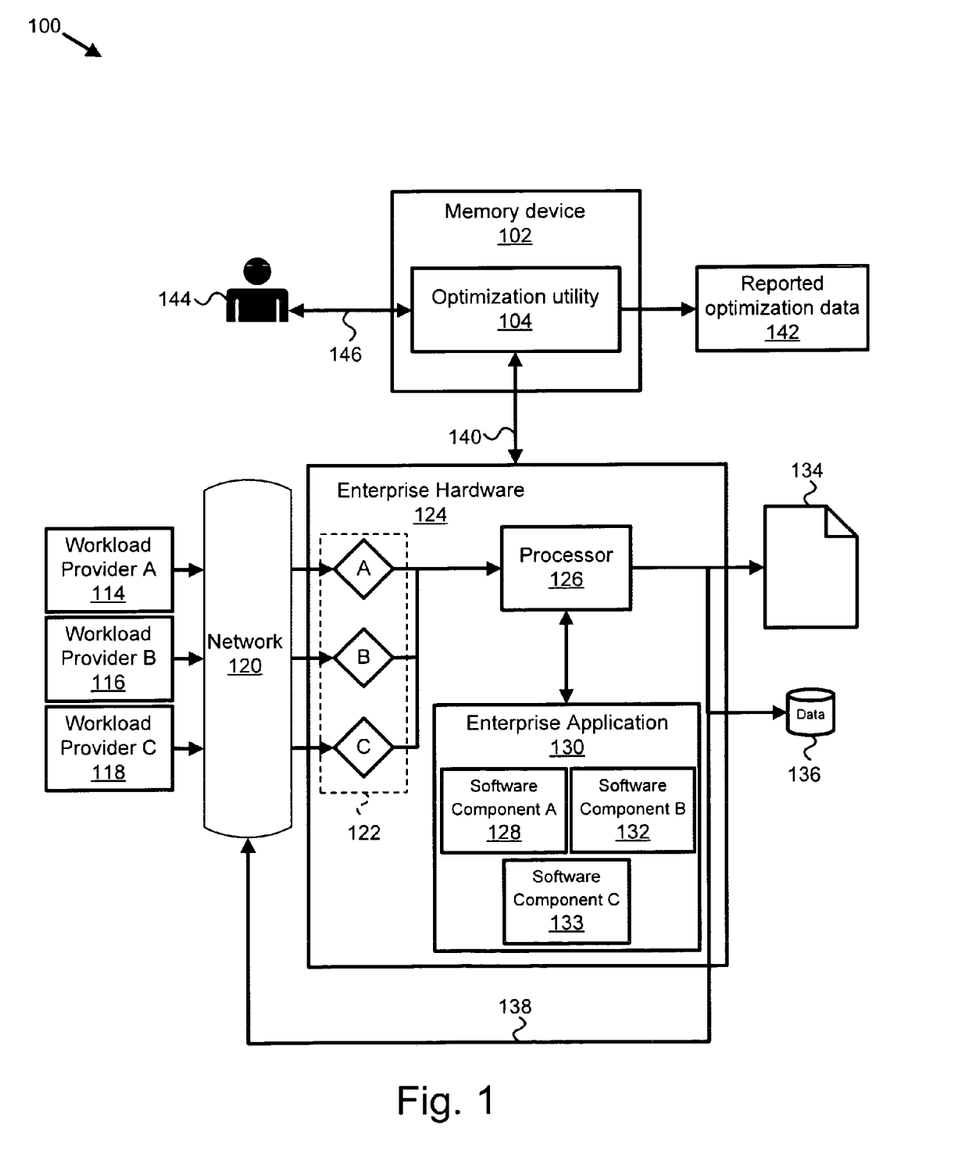
FIG. 1 is a schematic block diagram illustrating one embodiment of an enterprise application system in accordance with the present invention.

FIG. 1 depicts one embodiment of a system 100 to model and optimize an enterprise application. In one embodiment, the system has three workload providers 114, 116, 118 which generate workloads and communicate them to a network 120. The workloads are units of software operation that the enterprise application 130 performs via the processor 126. In one embodiment, the workloads may be event-triggered, call-triggered, or batch-triggered, and the enterprise application 130 processes each workload through one or more software components 128, 132, 133. In one embodiment, enterprise hardware 124 of the system 100 comprises a processor 126, a plurality of data entry points 122 in communication with a network 120, and an enterprise application 130. In one embodiment, the workload providers 114, 116, 118 each provide a different type of workload—for example Workload Provider A 114 may provide event-triggered workloads, Workload Provider B 116 may provide batch-triggered workloads, and Workload Provider C 118 may provide call-triggered workloads.

The embodiment of the enterprise hardware 124 depicted shows one processor 126. Those of skill in the art recognize that in some embodiments, there may be multiple processors 126. A single processor 126 is illustrated for clarity. Where an aspect of certain embodiments specifically depends upon the number of processors, this description will point that out.

The plurality of data entry points 122 is configured, in one embodiment, for individual data entry points A, B, C to receive workloads off of the network 120. For example, the first data entry point A may receive event-triggered workloads, the data second entry point B may receive batch-triggered workloads, and the third data entry point C may receive call-triggered workloads. Those of skill in the art will recognize that many other workload connections to the data entry points 122 are common—for example, reading workloads from a storage device, receiving workloads over the internet, accepting workloads through a terminal connected to the enterprise hardware 124, and the like.

In one embodiment, the processor 126 reads the workload information from the plurality of data entry points 122, and runs the enterprise application 130 which directs the various workloads to one or more software components 128, 132 to process the workload. A software component, in one embodiment, is a reusable segment of software code configured to perform an operation—for example, a subroutine, a function, or a script. Software components vary widely in form, size and function. The software components 128, used to process a workload may vary due to the workload type and the functionality the workload is to provide. For example, the workloads from Workload Provider A 114 may invoke the Software Component A 128, Software Component B 132, then Software Component C 133. A workload from Workload Provider B 116 may invoke Software Component A 128. A given workload will not necessarily be processed by every component 128, 132, 133 and may be processed by the same component 128, 132, 133 multiple times. The processed result of the workload may be sent to a file 134, a database 136, or sent 138 back to the network 120 for some other device (not shown) to utilize.

In one embodiment, the system 100 further includes a memory device 102, configured to report optimization information for the enterprise application 130 and enterprise hardware 124. The memory device 102, in one embodiment, includes an optimization utility 104 configured to receive data about the enterprise application 130, the enterprise hardware 124, and the workload providers 114, 116, 118, and to report optimization data 142 calculated from the received data. Receiving the data may occur through a communication 140 with the enterprise hardware 124, or through an interface 146 with a user 144 of the optimization utility 104.

The received data, in one embodiment, comprises a first dataset including the average arrival rates of workloads from the Workload Providers 114, 116, 118, the types of the workloads, which data entry point 122 each workload is associated with, the conditions of the system 100 wherein each workload executes, the relative complexity of each workload compared to a benchmark complexity, a throughput confidence value, and the list of software components 128, 132, 133 invoked by each workload. In one embodiment, the first dataset or any portion of the first dataset may be called the set of workload characteristics.

The conditions of the system 100 wherein each workload executes, or system operating conditions (SOC), may comprise a time of day—for example Workload Provider A may be a group of network 120 users that are expected provide workloads between 8 AM and 8 PM. Other SOCs that may be expected to predict the presence execution of a workload are known in the art, and are within the scope of the invention. For example, the SOC may comprise a geographical location, a currently selected client, a current manufacturing process, a control flag, or combinations of these.

In one embodiment, the throughput confidence value comprises the percentage of the time that the actual workload arrival rate should be lower than the expected workload arrival rate. If it is acceptable that a given actual workload arrival rate exceed the expected workload arrival rate 1% of the time, the throughput confidence value should be set to 99%. If it is acceptable that a given actual workload arrival rate exceed the expected workload arrival rate 0.001% of the time, the throughput confidence value should be set to 99.999%.

The received data, in one embodiment, may further include a second dataset comprising the processing capacity of the processor 126, the number of processors 126 within the enterprise hardware 124, and the relative processing times of each software component 128, 132, 133. The processing capacity of the processor 126 comprises any processing capacity definition known to those of skill in the art, including the time required for a set number of floating point operations, the time required for a set number of integer operations, the number of operations of a standard size that can be completed in a set time by the processor 126, and the like. In one embodiment, the second dataset or any portion of the second dataset may be called the job throughput benchmark.

The reported optimization data 142, in one embodiment, comprises a processor 126 utilization projection, a multi-parallelism recommendation for software components 128, 132, 133, and a data entry point 122 minimum job acquiring rate.

The processor 126 utilization projection comprises the predicted usage of the processor, typically as a percentage of usage relative to the maximum possible usage. In one embodiment, the processor 126 utilization projection may be a list of projected processor 126 utilization projections where each value corresponds to a value for the SOC.

The software component 128, 132, 133 multi-parallelism recommendation, in one embodiment, comprises a multi-parallelism value for the software component 128, 132, 133 to service substantially all workloads that use the software component 128, 132, 133 at any given time. The multi-parallelism value for this purpose is an allocation within the enterprise hardware 124 which allows a software component 128, 132, 133 to be used in multiple instances simultaneously, and in some operating systems this concept may use a name such as "concurrency" or "threading." For example, if the multi-parallelism value for software component A 128 is set to 10, up to 10 instances of software component A can exist simultaneously.

The data entry point 122 job acquiring rate, in one embodiment, is a data entry point 122 polling rate for batch-triggered and event-triggered workloads. For example, if data entry point 122 B receives batch-triggered workloads, and the job acquiring rate for data entry point 122 B is 100 jobs per second, then up to 100 jobs per second will be polled at data entry point 122 B. The data entry point 122 job acquiring rate, in one embodiment, for call-triggered data entry points 122 comprises the maximum number of jobs that can be received at the data entry point 122.

Figure 2:
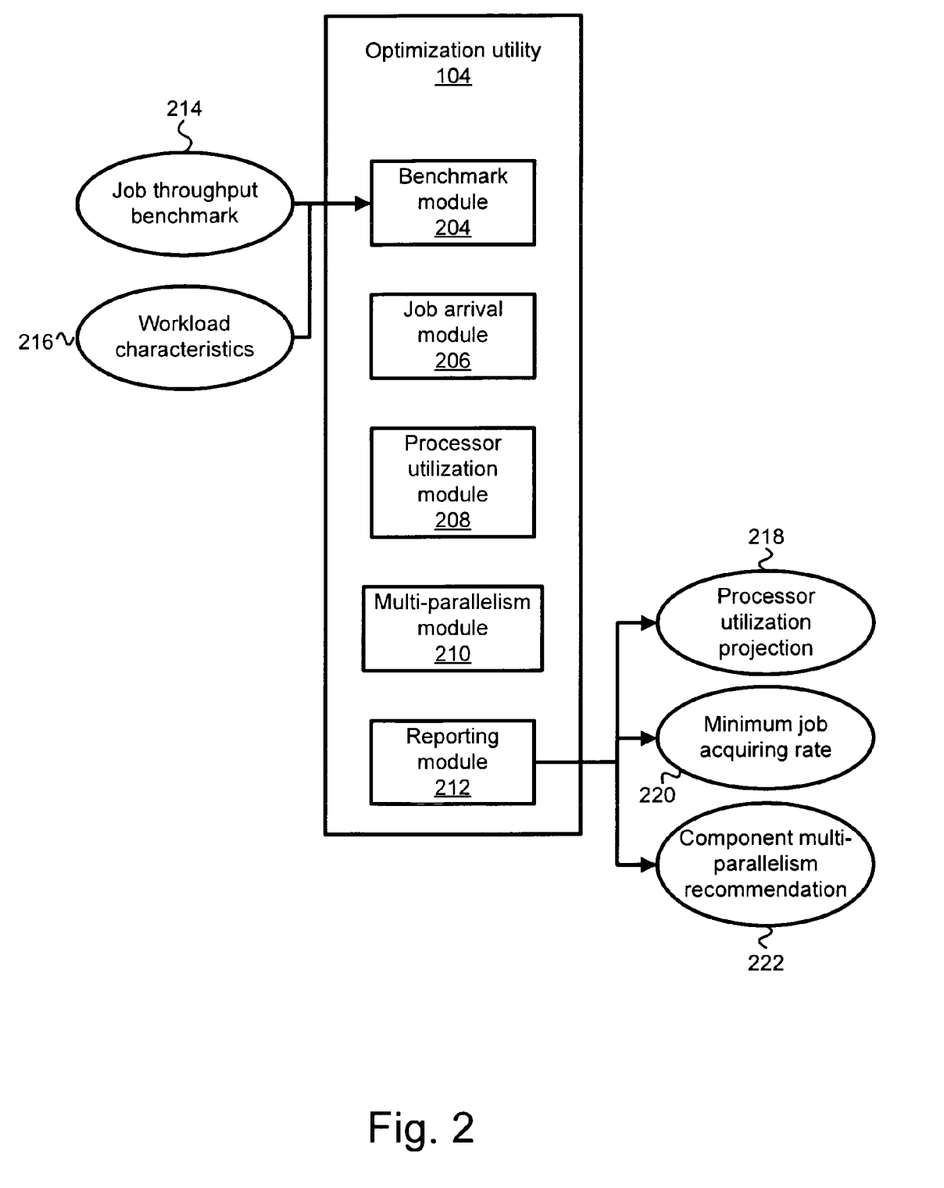
FIG. 2 is a schematic block diagram of an apparatus to determine optimization parameters for an enterprise application system in accordance with the present invention.

FIG. 2 depicts one embodiment of an optimization utility 104 configured to provide enterprise application optimization information. The optimization utility 104 comprises, in one embodiment, a series of modules configured to perform the operations to provide the enterprise application optimization information.

The optimization utility 104 includes, in one embodiment, a benchmark module 204 configured to receive a job throughput benchmark 214, and a set of workload characteristics 216. The job throughput benchmark 214, in one embodiment, relates to a target system 100 including the enterprise application for which the optimization utility 104 is providing optimization information.

The set of workload characteristics 216, in one embodiment, relates to workloads associated with data entry points 122 included by the target system 100. In one embodiment, the job throughput benchmark 214 and set of workload characteristics 216 comprise data for an operational target system 100. In another embodiment, the job throughput benchmark 214 and set of workload characteristics 216 comprise data for a planned target system 100. In one embodiment, the benchmark module 204 is configured to provide the job throughput benchmark 214 and workload characteristics 216 to other modules within the optimization utility 104.

The optimization utility 104 further includes, in one embodiment, a job arrival module 206 configured to determine expected job arrival rates for data entry points 122. In one embodiment, the expected job arrival rate for each data entry point 122 A, B, C comprises the average arrival rate for all workloads associated with the data entry point 122 A, B, C, corrected for expected random fluctuation in workload occurrence rate. The workload occurrence rate is the rate at which the workload providers 114, 116, 118 send workloads to the data entry points 122. In one embodiment, batch-triggered workloads are presumed to arrive at the data entry point 122 A, B, C with no fluctuation. In one embodiment, call-triggered and event-triggered workloads are presumed to be of randomly timed origin, with a nominal arrival rate equal to the average arrival rate, and with burst rate potential peaks equal to a Poisson's cumulative distribution at the confidence level about equal to the throughput confidence value for the given workload. In one embodiment, the job arrival module 206 determines an expected job arrival rate for each data entry point 122 A, B, C at each SOC.

The job arrival module 206 is further configured, in one embodiment, to determine a minimum job acquiring rate 220 for each data entry point 122 A, B, C. In one embodiment where entry points cannot adjust their job acquiring rates when the SOC changes, the minimum job acquiring rate for each data entry point 122 A, B, C is the maximum of the expected job arrival rates from each SOC for the given data entry point 122 A, B, C. For example, if a system 100 has 5 SOCs, and the expected job arrival rates for the data entry point 122A are 100, 50, 25, 30, and 55 jobs per second for the 5 SOCs, respectively, then the minimum job acquiring rate in one embodiment is 100 jobs per second. In another embodiment where it is possible for an entry point to adjust its job acquiring rate when the SOC changes, the job arrival module 206 is configured to provide a plurality of minimum job acquiring rates, where the plurality of minimum job acquiring rates comprises the list of expected job arrival rates for each SOC at each data entry point 122 A, B, C.

The optimization utility 104 further includes, in one embodiment, a processor utilization module 208 configured to determine the processor 106 utilization projection 218. In one embodiment, the processor utilization module 208 is configured to sum the processor load for all workloads active at a given SOC, and compare the sum of all the active workloads to the processing capacity of the processor 126 from the job throughput benchmark 214.

In one embodiment, the processor utilization module 208 projects the processor load for each workload at a given SOC by multiplying the expected job arrival rate for the workload at the given SOC by the relative complexity of the workload relative to the benchmark complexity. In one embodiment, the processor utilization module 208 is configured to report the maximum processor 126 utilization for any SOC as the processor utilization. In a preferred embodiment, the processor utilization module 208 reports the projection for the processor 126 utilization at each SOC.

The optimization utility 104 further includes, in one embodiment, a multi-parallelism module 210 configured to determine a multi-parallelism recommendation 222 for each of the software components 128, 132, 133. In one embodiment, the multi-parallelism module 210 is configured to calculate the maximum number of times each software component 128, 132, 133 can be simultaneously executed to service the workloads active at each SOC.

The multi-parallelism module 210 is configured, in one embodiment, to determine the simultaneous requirements by using the estimated arrival rate for workloads requiring the software component 128, 132, 133, by estimating the time required to service the workload, and by estimating the amount of time within servicing the workload required to execute the specific software component 128, 132, 133.

In one embodiment, the multi-parallelism module 210 is configured to perform the multi-parallelism requirement calculation for a component 128, 132, 133 using Little's Law, which states "the average number of jobs in a system is the product of the arrival rate and the average time a job spends in the system." In one embodiment, the multi-parallelism module 210 is configured to report all multi-parallelism requirements for each component 128, 132, 133 and each SOC as the component multi-parallelism recommendation 222. In a preferred embodiment, the multi-parallelism module 210 is configured to report one multi-parallelism requirement for each component 128, 132, 133 as the component multi-parallelism recommendation 222, where the maximum multi-parallelism requirement at any SOC for each component 128, 132, 133 is selected as the multi-parallelism requirement for the given component 128, 132, 133.

The optimization utility 104 further includes, in one embodiment, a reporting module 212 configured to report the processor utilization projection 218, the minimum job acquiring rate 220, and the component multi-parallelism recommendation 222. In one embodiment, the reporting module 212 provides these values to a user 144. In one embodiment, the reporting module 212 reports these values as electronic data for storage or further use by the system 100.

Figure 3:
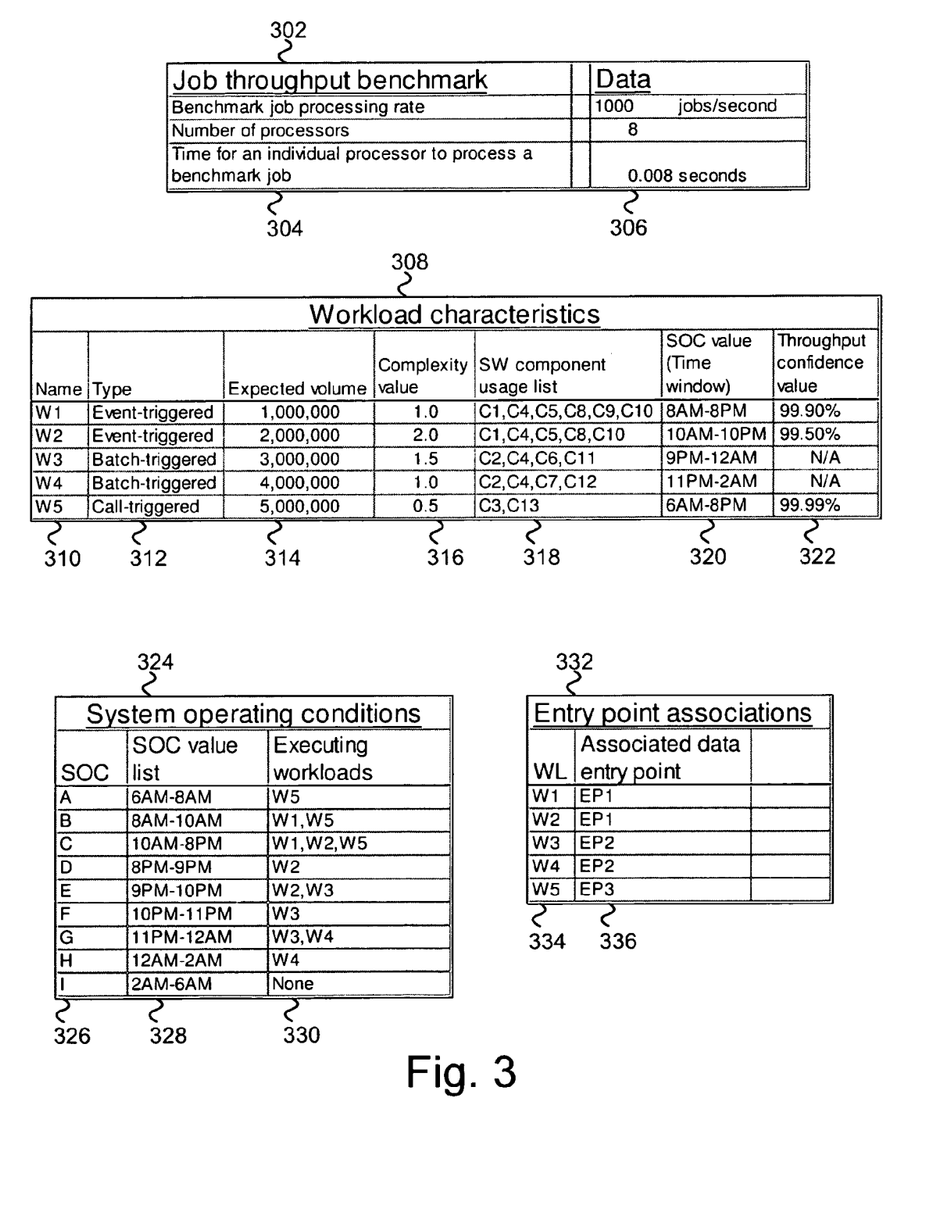
FIG. 3 is a series of tables illustrating one embodiment of a job throughput benchmark, workload characteristics, system operating conditions, and workloads associated with data entry points in accordance with the present invention.

FIG. 3 illustrates one embodiment of a job throughput benchmark 302, a set of workload characteristics 308, a set of system operating conditions (SOCs) 324, and a set of entry point associations 332 in accordance with the present invention.

In one embodiment, the job throughput benchmark 302 comprises a list of data entries 304, and a corresponding list of data values 306 to describe the amount of resources available on the system 100. In one embodiment, the list of data entries 304 comprises a benchmark job processing rate measured by the maximum number of jobs of the benchmark workload that can be executed per second, a number of processors 126 on the system 100, and a time for an individual processor to process a benchmark job calculated by dividing the number of processors by the benchmark processing rate. In one example embodiment, the list of data values 306 comprise 1000 benchmark jobs per second for the benchmark job processing rate and there are 8 processors on system 100. Thus it takes 0.008 seconds for an individual processor to process each benchmark job.

In one embodiment, the workload characteristics 308 comprise a list of workload names 310, a corresponding list of workload types 312, a corresponding list of expected volume 314, a corresponding list of complexity values 316, a corresponding list of software component usage lists 318, a corresponding list of time window values 320, and a corresponding throughput confidence value 322. In one embodiment, the complexity value 316 represents the resource requirement of the workload 310 compared to that of the benchmark workload. For example, the sample workload characteristics 308 show a complexity value of 2.0 for workload W2, and 0.5 for workload W5. Therefore, in the example assuming no other jobs are running, W2 is expected to require about twice the processing time of the benchmark job, while W5 is expected to require about half the processing time of the benchmark job.

In one embodiment, the list of time window values 320 represents the time window during which the corresponding workload 310 executes. In one embodiment, the list of time window values 320 may be replaced with a parameter suitable for an SOC determination, for example, a geographical location, a currently selected client, a current manufacturing process, a control flag, or combinations of these.

The SOCs 324, in one embodiment, comprise a list of SOC identifiers 326, a corresponding SOC value list 328, and a corresponding list of executing workloads 330. In one embodiment, the SOCs 324 are entered directly by a user 144, are taken from log file, or are read from a data file. In one embodiment, the benchmark module 204 is configured to derive the SOCs 324 from the workload characteristics 308 to automatically build the SOCs 324.

A number of configurations for the benchmark module 204 to automatically build the SOCs 324 from the workload characteristics 308 are within the skill of one in the art, but one specific configuration is illustrated for clarity. In a preferred embodiment, the benchmark module 204 is configured to determine the possible values for the SOC value—the time window 320 in the example—and to iterate a test parameter through each possible SOC value. The benchmark module 204 may be configured to determine whether each workload 310 is executing or not executing at each SOC value via the SOC value 320.

In one embodiment, the benchmark module 204 is then configured to group the test parameter values wherein the list of executing workloads is identical, and further configured to enter an SOC identifier 326, corresponding SOC 328, and corresponding list of executing workloads 330 for the SOC 328 into a data structure similar to the SOCs 324. For example, the benchmark module 204 is configured, in one embodiment, to iterate through all time of day values, to check whether the current time of day value is represented in the time window 320 for each workload 310. Using the sample workload characteristics 308, the preferred embodiment indicates identical executing workloads—i.e. only W5 is executing—from 6 AM to 8 AM, so the benchmark module 204 sets aside the SOC 324 values from 6 AM to 8 AM SOC "A" 324.

In one embodiment, each workload 310 is associated with single data entry point 122 A, B, C. In one embodiment, each of the data entry points 122 accepts a workload type 312, and the data entry point 122 A, B, C associated with the workload 310 may be implicit in the workload type 312. In one embodiment, an entry point association's 332 data structure is entered by a user 144, taken from a log file, or read from a data file. The entry point association's 332 data structure, in one embodiment, comprises a workload identifier list 334, and a corresponding associated data entry point list 336.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
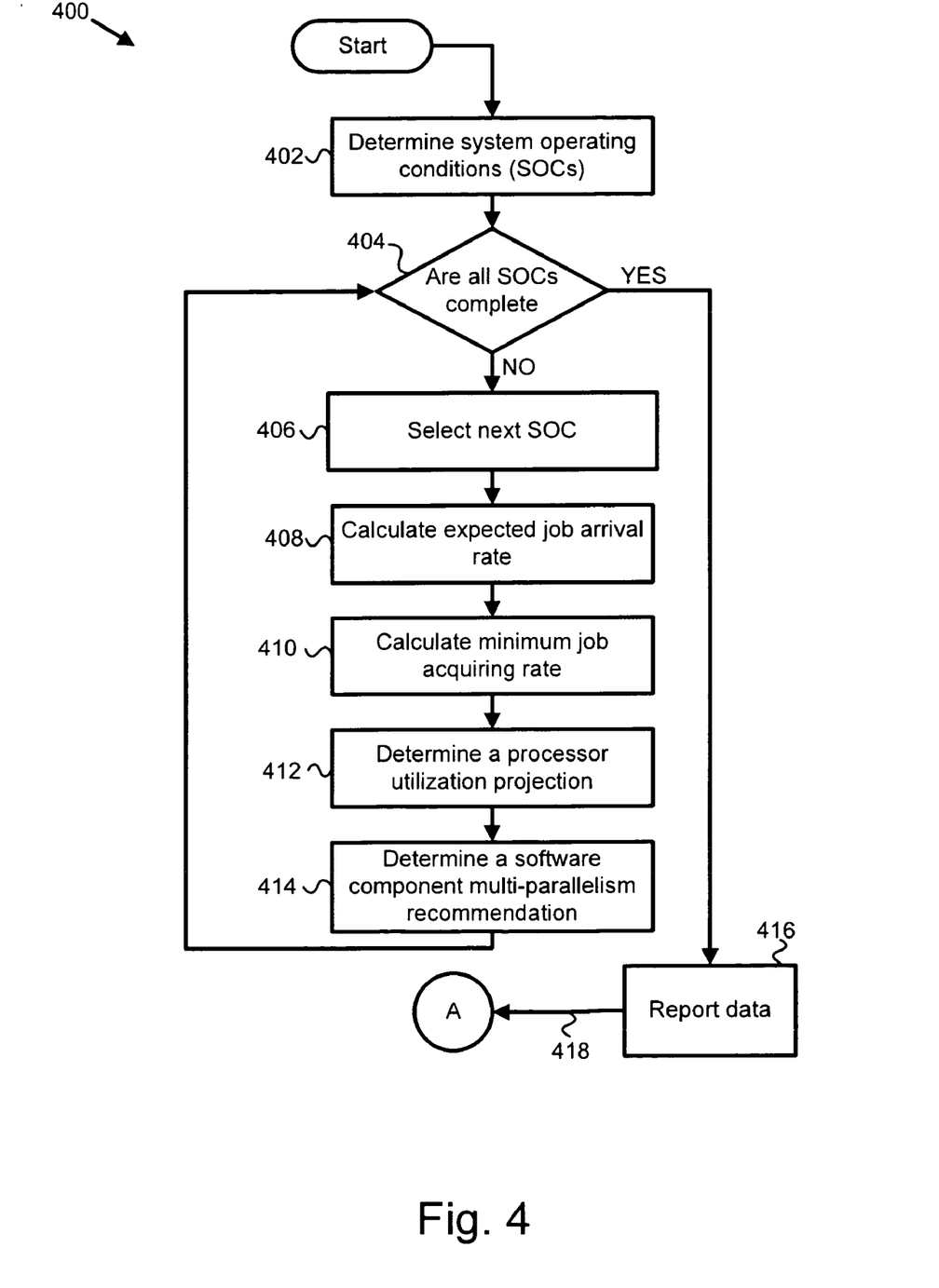
FIG. 4 is a schematic flow chart diagram illustrating one embodiment of a method to determine optimization parameters for an enterprise application system in accordance with the present invention.

FIG. 4 illustrates one embodiment of a method 400 to determine and report optimization data for an enterprise application in accordance with the present invention. In one embodiment, the optimization utility 104 executes the method 400. The method 400 begins, in one embodiment, with the benchmark module 204 determining 402 the SOCs 324 for the target system 100. Determining 402 the SOCs 324 may comprise reading the SOCs from a file or automatically building the SOCs 324 from the workload characteristics 308.

The method 400, in one embodiment, continues with the optimization utility 104 determining 404 whether the optimization parameters have already been determined for each SOC 326 If the optimization utility 104 determines 404 that optimization parameters have not been determined for each SOC 326, the optimization utility 104 selects 406 the next SOC 326 from the SOC table 324, and the job arrival module 206 calculates 408 an expected job arrival rate for each of the executing workloads 330 corresponding to the selected SOC 326.

In one embodiment, the job arrival module 206 assumes that workloads 310 of the workload type 312 "batch-triggered" workloads are schedule jobs, and expected volume 314. In one embodiment, the job arrival module 206 assumes that workloads 310 of the workload type 312 "event-triggered" and "call-triggered" are of randomly timed origin, with a nominal arrival rate equal to a value of expected volume 314 divided by the length of time window 320, and with burst rate potential peaks equal to a Poisson's cumulative distribution at the confidence level about equal to the throughput confidence value 322 for the workload 310. In one embodiment, the job arrival module 206 uses the following equation to calculate 408 the expected burst job arrival rate for "event-triggered" and "call-triggered" workloads 310:

$$\sum_{m=0}^{ar_{w_i}} \frac{e^{-xr_{w_i}} \cdot (xr_{w_i})^m}{m!} \geq p\%. \qquad \text{Equation 1}$$

Where $w_i$ represents each workload 310, $ar_{w_i}$ is the expected burst job arrival rate for the workload 310 $i$, $xr_{w_i}$ is the average arrival rate, and p % is the throughput confidence value 322. For example, workload 310 W1 from the workload characteristics 308 has an $xr_{w_i}$ of about 23.1 jobs/second (1,000,000 jobs/12 hours), and a p % of 99.9%, so equation 1 yields an $ar_{w_i}$ of 39. Stated differently, throughout the time period that W1 is executing, W1 supplies an average of 23.1 jobs/second, and 99.9% of the time the expected burst job arrival rate will be less than 39 jobs per second.

The job arrival module 206 may use other information in calculating 408 the expected job arrival rate. For example, the user 144 may know, in one embodiment, that the workload provider 114, 116, 118 associated with the workload in question may be incapable of providing a burst job rate above a certain value, and in that case calculating 408 the expected job arrival rate further includes capping the expected job arrival rate at the maximum value representing the workload provider 114, 116, 118 maximum capability.

The method 400 continues, in one embodiment, with the job arrival module 206 calculating 410 the minimum job acquiring rate for each of the data entry points 122. In one embodiment, the job arrival module 206 stores the job acquiring rate required for each SOC 326 for each data entry point 122 as a list of minimum job acquiring rates for each data entry point 122.

In one embodiment, the job acquiring rate for data entry points 122 receiving call-triggered workloads 310 is the number of calls by which the data entry point 122 receives. In one embodiment, the job acquiring rate for data entry points 122 receiving event-triggered workloads 310 is a recommended rate to poll jobs at the data entry point 122. In one embodiment, the job acquiring rate for data entry points 122 receiving batch-triggered workloads 310 is a recommended rate to poll jobs at the data entry point 122.

There are multiple ways that an entry point acquires jobs of batch-triggered workloads. In one embodiment where the entry point is not responsible for preventing the enterprise application system from job overflowing, an entry point acquires all the jobs of any batch workloads when they are present. In another embodiment, an entry point polls jobs at a fixed frequency to prevent overflowing but does not move to a second workload until all jobs in the current workload have been acquired. In another embodiment, an entry point polls jobs across multiple workloads in a round-robin fashion at a fixed frequency from job to job to prevent overflowing. In yet another embodiment, an entry point polls jobs across multiple workloads in a round-robin fashion at a fixed frequency between the round-robin cycles to prevent overflowing. In yet another embodiment, advanced throttling technology allows an entry point to dynamically adjust its job acquiring rate according to system utilization rate.

Dependent on the different way that an entry point acquires batch-triggered jobs described above, there also are multiple ways for the job arrival module 206 to calculate minimum job acquiring rate for each entry point. In one embodiment, the job arrival module 206 sets the minimum job acquiring rate for each data entry point 122 that services batch-triggered workloads to the highest polling rate required to service the workload 310 at any SOC 326. Other methods of setting entry point minimum job acquiring rates are well known in the art.

In the example embodiment shown in FIG. 3, it is assumed that the entry point "EP2" 336 acquires batch-triggered jobs across multiple workloads in a round-robin fashion at a fixed frequency between the round-robin cycles. In the example, workload W3 requires (3,000,000/(3*3,600)=) 278 jobs/second to be serviced by the data entry point "EP2" 336. Similarly, workload W4 requires (4,000,000/(33,600)=370 jobs/second to be serviced by the data entry point "EP2" 336. To complete servicing both W3 and W4 in the allowed time window, the minimum job acquiring rate of entry point "EP2" is set to 370 round-robin cycles per second (the highest required polling rate of all the workloads serviced by the entry point is the larger between 278 and 370). Because the frequency of round-robin cycles is fixed, the job acquiring rate for both W3 and W4 is also fixed at 370 jobs/second.

Once the minimum job acquiring rate has been decided, the job arrival module 206 estimates the actual end time for each batch-triggered workload. In the same example embodiment, W3's actual processing time is estimated as 3,000,000/370=8,108 seconds, or 2 hours and 15 minutes, which puts the estimated actual end time for W3 at 11:15 PM. W4's actual processing time is estimated as 4,000,000/370=10,811 seconds, or 3 hours, which puts the estimated actual end time for W3 at 2:00 AM. Because all of W3 jobs are estimated to finish before its allowed time window expires at 12 AM, resources usage during SOC 'G' will drop at 11:15 PM when the last W3 job has been completed. The job arrival module 206 therefore may break the SOC 'G' into two SOCs 11 Pm-11:15 PM and 11:15 PM-12 AM.

In one embodiment, after breaking up any SOC 326 due to earlier end times than allowed time windows, the job arrival module 206 selects the sum of the expected job arrival rates, for all executing workloads 330 associated with a given data entry point 122 at the current SOC 326, as the minimum job acquiring rate for the data entry point 122 A, B, C at the current SOC 326. For example, at SOC "C", W1 executes with an expected job arrival rate of 39 jobs per second, and W2 executes with an expected job arrival rate of 64 jobs per second (calculated from Equation 1, with the data from the Workload characteristics 308), therefore, in one embodiment, the minimum job acquiring rate for the associated data entry point "EP1" 336 at SOC "C" 326 is (39+64→) 103 jobs per second.

In one embodiment where entry points cannot adjust its job acquiring rates when SOC changes, the job arrival module 206 selects the maximum job acquiring rate required, at any SOC 326, for a given data entry point 122 A, B, C as the minimum job acquiring rate for that data entry point 122 A, B, C. In another embodiment where it is possible for an entry point to adjust its acquiring rate when SOC changes, the job arrival module 206 selects sets the job acquiring rate required for a given data entry point 122 A, B, C at any SOC 326 by initially setting the job acquiring rate for the data entry point 122 A, B, C as zero, and updating the job acquiring rate after each selection 406 of the next SOC 136 with the maximum of the job acquiring rate of the previous iteration, and to the job arrival rate of the current SOC 326.

The method 400 continues, in one embodiment, with the processor utilization module 208 determining 412 a processor utilization projection 218 for each SOC 326. In one embodiment, the processor utilization module 208 determines the processor utilization projection 218 at a given SOC 326 by taking the sum of the processor resource requirement for each executing workload 330 during the SOC 326, divided by the benchmark job processing rate from the job throughput benchmark 302. The processor resource requirement for each workload is the expected job arrival rate of that workload, multiplied by the complexity value 316 of the workload. Equation 2 illustrates this calculation.

$$u_{SOC_k}\% = \frac{\sum_{i=1,2,...} (aradj_{w_iSOC_k})}{br}.$$
Equation 2

Where k specifies each SOC, $u_{SOC_k}\%$ is the processor utilization projection 218 for the SOC 326 corresponding to k, br is the benchmark job processing rate from the job throughput benchmark 302, and ($aradj_{w_iSOC_k}$) is the expected job arrival rate, as determined by the job arrival module 206, of workload 310 i multiplied by the complexity value from the workload characteristics 304.

Figure 5:
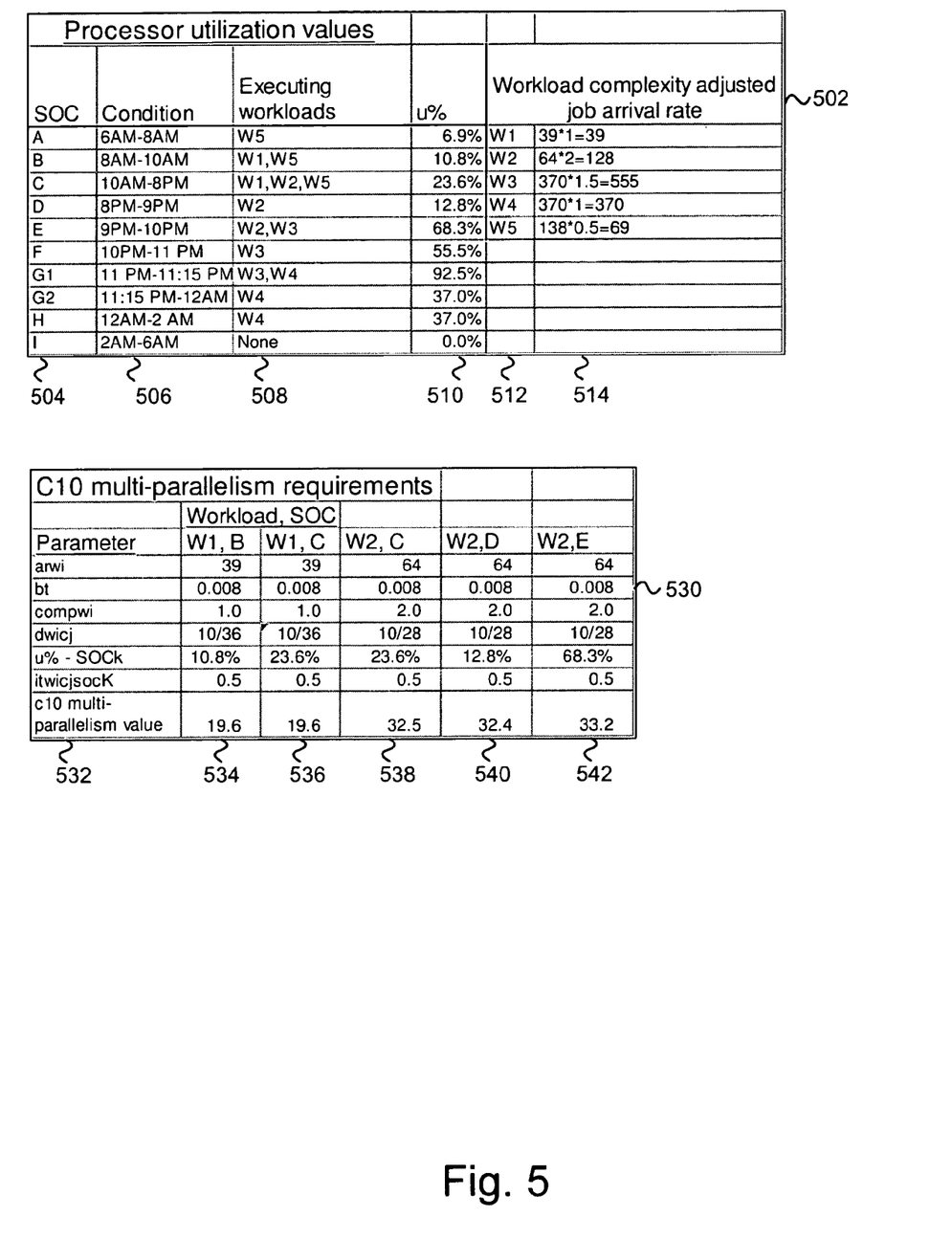
FIG. 5 is a series of tables illustrating one embodiment of values used in determining processor utilization projections and software component multi-parallelism requirements in accordance with the present invention.

FIG. 5 illustrates processor utilization projections 218 determined by the processor utilization module 208 in accordance with the present invention. The table 502 is one embodiment using the data from FIG. 3.

For the embodiment described above and shown in table 502, W3 ends at 11:15 PM 506, creating two different job service rates and also different processor resource requirements, within the same SOC "G". Therefore the job arrival module 206, in one embodiment, automatically breaks the SOC "G" into an SOC "G1" and another SOC "G2" to correctly report the potential change in processor utilization from SOC "G1" to SOC "G2".

In one embodiment, if a processor utilization projection 510 is estimated to exceed 100% for any SOC, the reporting module 212 can identify it as a warning during the planning phase of the system 100 supported by the enterprise application software 130 such that the planner or maintainer of the system 100 can make adjustments to address the issue.

In another embodiment, if a processor utilization projection 510 exceeds 100% during runtime, the optimization utility 104 makes dynamic adjustments to lower the job acquiring rate at one or more entry points to address the issue. In another embodiment, the optimization utility 104 automatically provision more resources to system 100 by adding more processors.

Returning now back to FIG. 4, the method 400 continues in one embodiment, with the multi-parallelism module 210 determining 414 a multi-parallelism recommendation for each software component. In one embodiment, the multi-parallelism module 210 uses Little's Law to determine the multi-parallelism value for a software component required to service the workloads. Little's Law states, "The average number of jobs in a system is the product of the arrival rate and the average time a job spends in the system." The multi-parallelism module 210 determines a multi-parallelism recommendation 222 by first determining the multiple-parallelism requirement of a software component for each workload at each SOC in Equation 3.

Little's Law:

$$n_{w_ic_jSOC_k} = ar_{w_i} \cdot rt_{w_ic_jSOC_k}$$

-continued
$$= ar_{w_i} \cdot (pt_{w_ic_jSOC_k} + it_{w_ic_jSOC_k})$$

$$= ar_{w_i} \cdot \left(\frac{ct_{w_ic_j}}{1 - u_{SOC_k}} + it_{w_ic_jSOC_k}\right)$$

Therefore:

$$= ar_{w_i} \cdot \left(\frac{bt \cdot comp_{w_i} \cdot d_{w_ic_j}}{1 - u_{SOC_k}} + it_{w_ic_jSOC_k}\right).$$
Equation 3

Where $w_i$ represents each workload, $c_j$ represents each software component and $SOC_k$ represents each SOC. $n_{w_ic_jSOC_k}$ is the multi-parallelism requirement of software component j for workload 310 i at SOC 326 k and can calculated according to Little's Law as the product of $ar_{w_i}$, the expected job arrival rate for workload 310 and $rt_{w_ic_jSOC_k}$, the software component response time. $rt_{w_ic_jSOC_k}$ consists of $pt_{w_ic_jSOC_k}$, the software component actual processing time, and $it_{w_ic_jSOC_k}$, any idle time associated with software component 128, 132, 133 j, workload 310 i and SOC 326 k. $pt_{w_ic_jSOC_k}$ can be calculated from the component's CPU time usage $ct_{w_ic_j}$ while considering the fact that only part of the system 100 is available to this workload, $1-u_{t_k}\%$. Also $ct_{w_ic_j}$ is the software component 128,132,133 j's CPU time usage for workload 310 i assuming system 100 is entirely available for this workload. $ct_{w_ic_j}$ can be deducted from multiplying the time for a CPU to process a job through the entire workload (bt·$comp_{w_i}$) by the component's event processing time distribution ratio $d_{w_ic_j}$, where bt is the time required to process a benchmark job by a single processor 304, $comp_{w_i}$ is the complexity value 318 of workload i, $d_{w_ic_j}$ is the percentage of the total workload processing time dedicated to the component j, and $u_{SOC_k}$ is the processor utilization projection 218 for the SOC.

In one embodiment, the multi-parallelism module 210 determines the component multi-parallelism recommendation 222 by first summing all the multi-parallelism requirements for a particular software component from equation 3 above for all workloads 310 i that use the software component at a given SOC 326 k, to get the total multi-parallelism recommendation for a single SOC 326. The multi-parallelism module 210 then repeats the process, in one embodiment, to get the software component's multi-parallelism recommendation for each SOC 326. In one embodiment where component multi-parallelism is fixed and cannot be adjusted dynamically, the multi-parallelism module 210 then determines the component multi-parallelism recommendation 222 by selecting the maximum multi-parallelism recommendation from the multi-parallelism recommendations among all SOCs 326.

An example calculation, consistent with one embodiment of the method 400, for determining the component multi-parallelism recommendation 222 for component C10, as used in the software component usage list 318, is presented. For the purposes of the example, the idle time $it_{w_ic_{10}SOC_k}$ is assumed to be 0.5 seconds for all workloads 310, it is further assumed that the processor utilization projections 510 have already been determined by the processor utilization module 208, and that the data from FIG. 5 is used. Finally, the relative processing times for components C1-C13, respectively, are assumed to be 4, 2, 2, 6, 6, 4, 3, 2, 8, 10, 4, 5, and 1 processing units.

The relative processing times are simply the relative processing time required for the various components, and these values can be determined for any given system 100 once the contents of the software components 128, 132, 133 are known. For example, the relative processing time of C3 is 2 units, and the relative processing time for C5 is 6 units, so if a given workload 310 operation uses the component C3 one time, and the component C5 one time, the processing of that workload 310 will spend three times as much time operating the C5 component as the C3 component.

The workloads using C10 are W1 and W2, as indicated in the software component usage list 318, so the multi-parallelism module 210 calculates the multi-parallelism requirement for each SOC 504 under which W1 or W2 is executed. The executing workloads list 508 shows that W1 is active during SOCs 504 B and C, and W2 is active during SOCs 504 C, D and E. The value $ar_{w1}$ is 39, the value bt is ($8/1000 \rightarrow$) 0.008, the processing time distribution of software component $c_{10}$ in workload $w_1$ $d_{w_1 c_{10}}$ is equal to $(10/(4+6+6+2+8+10)\rightarrow) 0.278$, the value $u_{SOC_B}$ is 0.108, and the value $comp_{w_1}$ is 1.0. Plugging these values into equation 3 above, we get $n_{w_1 c_{10} SOC_B}$ equal to 19.6, or C10 requires a multi-parallelism value of 19.6 to service W1 during SOC 504 B. The W1 SOC 504 B values are shown in the C10 multi-parallelism requirements table 530 (See FIG. 5) under W1,B 534. Similarly, the parameters 532 are shown for each workload 310 and SOC 504 utilizing C10 534, 536, 538, 540, 542.

Each SOC has a component multi-parallelism requirement of the sum of the multi-parallelism values for all workloads using the component in a given SOC, so the multi-parallelism requirement for C10, SOC 504 C is a multi-parallelism value of $(19.6+32.5\rightarrow) 52.1$, rounded up to 53. In one embodiment where component multi-parallelism can be adjusted dynamically, the component multi-parallelism recommendation 222 for C10 is the list of multi-parallelism requirements corresponding to the SOCs 504. In one embodiment, the C10 component multi-parallelism recommendation 222 is (0, 20, 53, 33, 34, 0, 0, 0, 0) corresponding to SOCs 518 A-I, respectively. In another embodiment where component multi-parallelism is fixed and cannot be adjusted dynamically, the component multi-parallelism recommendation 222 is the maximum required at any SOC 518, or 53 for C10 in the example.

In one embodiment, referring back to FIG. 4, the method 400, proceeds with the reporting module 212 reporting 416 optimization data for the enterprise application 130 when the optimization utility 104 determines 404 that optimization values for all SOCs 326 are complete. In one embodiment, the reporting module 212 reports 416 the SOCs 326, the expected job arrival rates, the minimum job acquiring rates 220, the processor utilization projections 218, and the multi-parallelism recommendations 222. In one embodiment, reporting 416 optimization data comprises delivering the information to an interface 146 with the user 144. In one embodiment, reporting 416 optimization data comprises storing the data in a file. In one embodiment, reporting 416 comprises delivering 418 reported optimization data 416 to another part of the system 100 for further processing.

Figure 6:
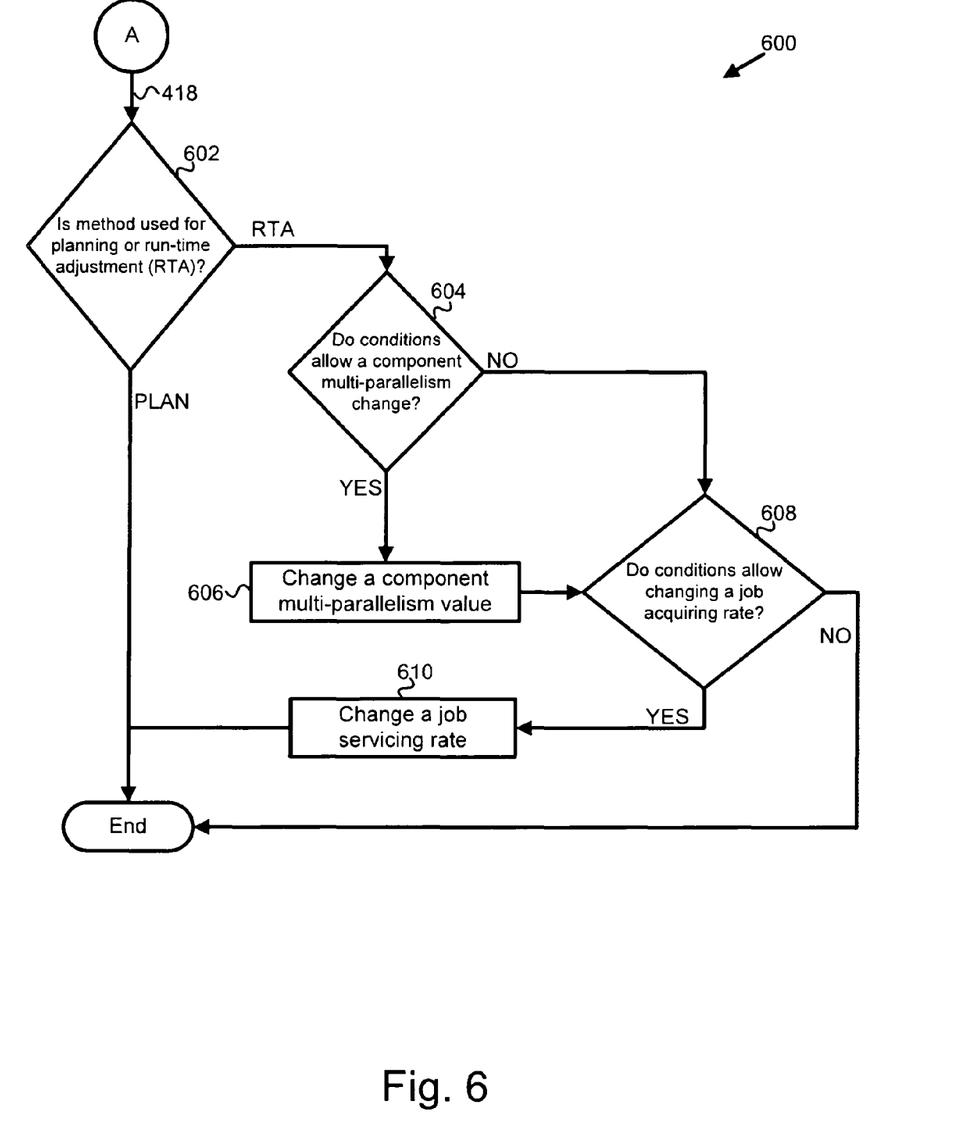
FIG. 6 is a schematic flow chart diagram illustrating one embodiment of a method to implement optimization parameters for an enterprise application system in accordance with the present invention.

FIG. 6 illustrates one embodiment of a method 600 to change enterprise application 130 parameters based on the reported optimization data 142. The method 600 to change parameters follows the method 400 to determine optimization parameters, in one embodiment, by receiving 418 the optimization data.

The method 600 proceeds, in one embodiment, with the optimization utility checking 602 whether the method is currently being used as a planning tool or as a run-time adjustment tool. In one embodiment, checking 602 whether the method is currently being used as a planning tool or as a run-time adjustment tool comprises checking a calibratible software parameter value. If the method 600 is being used as a planning tool, the method 600 ends. If the method 600 is being used as a real-time adjustment tool, the optimization utility 104 checks 604 whether current conditions allow a software component 128, 132, 133 multi-parallelism change. The conditions which may allow a software component 128, 132, 133 multi-parallelism change may include a desired amount of time elapsed since the last change, a software change in part of the system 100, a recent change of SOC 326, and a change in the expected job arrival rate of a workload 310.

If the conditions allow a software component 128, 132, 133 multi-parallelism change, the optimization utility 104 changes 606 a software component 128, 132, 133 multi-parallelism value based on the component multi-parallelism recommendation 222 for that component. Preferably, the multi-parallelism value for the component is changed to a value determined by a calculation involving the component multi-parallelism recommendation 222. For example, the change 606 may comprise a change to the component multi-parallelism recommendation 222, a change to the multi-parallelism recommendation for the current SOC 326 from data such as table 530, or a change to a value some fraction of the way between the current component multi-parallelism value and the component multi-parallelism recommendation 222.

If the conditions do not allow a component multi-parallelism change, the method 600 proceeds with the optimization utility 104 checking 608 whether current conditions allow a data entry point 122 job acquiring rate change. The conditions which may allow a job acquiring rate change may include a desired amount of time elapsed since the last job acquiring rate change, a software change in part of the system 100, a recent change of SOC 326, and a change in the expected job arrival rate of a workload 310.

If the conditions allow a job acquiring rate change, the optimization utility 104 changes 610 a data entry point 122 job acquiring rate based on the minimum job acquiring rates 220 and the processor utilization projections 218. Preferably, the job acquiring rate for a data entry point 122 is changed 610 to a value determined by a calculation involving the minimum job acquiring rates 220 and the processor utilization projections 218. For example, the change 606 may comprise a change to the minimum job acquiring rate, a change to the minimum job acquiring rate 220 for the current SOC 326, a change to a job acquiring rate that keeps a processor utilization projection 218 below a threshold, and a change to a job acquiring rate some fraction of the way between the current job acquiring rate and a calculated job acquiring rate.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to provide enterprise application performance modeling and optimization information, the apparatus comprising:
   a storage device storing computer executable code;
   a processor executing the computer executable code, the executable code comprising:
   a benchmark module configured to receive a job throughput benchmark relating to an enterprise application having a plurality of data entry points and a plurality of software components, wherein each data entry point serves at least one workload of a workload type, the benchmark module further configured to receive a set of workload characteristics relating to each workload;

a job arrival module configured to calculate plurality of expected job arrival rates as average arrival rates of each system operating condition for each data entry point based on the workload characteristics of the workloads associated with the data entry point, and to calculate a minimum job acquiring rate as a maximum of the plurality of expected job arrival rates for each data entry point;

a processor utilization module configured to determine a processor utilization projection based on the job throughput benchmark, the expected job arrival rate for each of the plurality of data entry points, the minimum job acquiring rate for each of the plurality of data entry points, and the set of workload characteristics for each workload;

a multi-parallelism module configured to determine a software component multi-parallelism recommendation for each of the plurality of software components based on the job throughput benchmark, the processor utilization projection, and the expected job arrival rate for each workload; and a reporting module configured to report the processor utilization projection, the minimum job acquiring rate, and the software component multi-parallelism recommendations.

2. The apparatus of claim 1 wherein the workload characteristics relating to each workload comprise a workload type, a workload arrival rate, an average complexity value, a workload software component usage list, a throughput confidence value, and a system operating condition defined such that the related workload executes while the system operating condition is satisfied.

3. The apparatus of claim 2, wherein the job throughput benchmark comprises a processing time value of a benchmark job and the average complexity value comprises an expected processing time value of a workload job relative the processing time value of the benchmark job.

4. The apparatus of claim 2, wherein the job arrival module is further configured to calculate an expected burst job arrival rate by applying the workload arrival rate, and the throughput confidence value in a manner consistent with a cumulative Poisson distribution to derive the expected burst job arrival rate for workloads of randomly timed origins.

5. The apparatus of claim 2, wherein the multi-parallelism module is further configured to determine each software component multi-parallelism recommendation by applying the expected job arrival rate, the job throughput benchmark, and the processor utilization projection in a manner consistent with Little's Law to determine a multi-parallelism value required for at least one software component to service all workloads which use the at least one software component.

6. The apparatus of claim 1, wherein the workload type is selected from a group consisting of a batch-triggered workload type, a call-triggered workload type, and an event-triggered workload type.

7. A method for providing enterprise application workload performance information, the method comprising:

receiving, by use of a processor a job throughput benchmark for executing an enterprise application having a plurality of data entry points and a plurality of software components;

receiving a set of workload characteristics for each of at least one workload associated with each data entry point, each data entry point configured to accept a workload type, and wherein the workload characteristics for each workload comprise an execution time window, a workload arrival rate, an average complexity value, a software component usage list and a throughput confidence value;

calculating a minimum job acquiring rate and plurality of expected job arrival rates as average arrival rates of each system operating condition for each data entry point based on workload characteristics of the workloads associated with the data entry point;

determining a processor utilization projection based on the job throughput benchmark, the expected job arrival rate for each of the plurality of data entry points, the minimum job acquiring rate for each of the plurality of data entry points, and the workload characteristics, the minimum job acquiring rate calculated as a maximum of the plurality of expected job arrival rates for each of the plurality of data entry points;

determining a software component multi-parallelism recommendation for each of the plurality of software components based on the job throughput benchmark, the processor utilization projection, and the expected job arrival rate for each data entry point; and reporting the processor utilization projection, the minimum job acquiring rate, and the software component multi-parallelism recommendations.

8. The method of claim 7, wherein the job throughput benchmark comprises a processing capacity, wherein the processing capacity comprises a number of standard complexity jobs which can be processed per unit of time.

9. The method of claim 7, further comprising reporting a plurality of time windows, wherein each time window comprises the time between a beginning time and an ending time such that the enterprise application completes processing of the workload within the time boundaries of the beginning time and the ending time.

10. The method of claim 9, further comprising reporting a plurality of processor utilization projections, wherein each processor utilization projection corresponds to one of the plurality of time windows.

11. The method of claim 10, further comprising reporting a plurality of minimum job acquiring rates, wherein each job acquiring rate corresponds to one of the plurality of time windows.

12. The method of claim 9, further comprising reporting a plurality of multi-parallelism recommendations, wherein each multi-parallelism recommendation corresponds to one of the plurality of time windows.

13. The method of claim 7, wherein receiving the set of workload characteristics comprises estimating the set of workload characteristics for an anticipated system.

14. The method of claim 7, wherein receiving the set of workload comprises estimating the set of workload characteristics for an existing system.

15. The method of claim 14, wherein receiving the set of workload characteristics comprises measuring the set workload characteristics for an existing system.

16. A system to model and optimize enterprise software, the system comprising:

a plurality of workload providers in communication with a network;

a central processor in communication with the plurality of workload providers through a plurality of data entry points across the network;

a memory device storing computer executable code executed by a processor, the computer executable code comprising:

a benchmark module configured to receive a job throughput benchmark relating to an enterprise application having a plurality of data entry points and a plurality of software components, wherein each data entry point has at least one associated workload, the benchmark module further configured to receive a set of workload characteristics relating to each workload;

a job arrival module configured to calculate plurality of expected job arrival rates as average arrival rates of each system operating condition for each data entry point based on the workload characteristics of the workloads associated with the data entry point, and to calculate a minimum job acquiring rate as a maximum of the plurality of expected job arrival rates for each data entry point;

a processor utilization module configured to determine a processor utilization projection based on the job throughput benchmark, the expected job arrival rate for each of the plurality of data entry points, the minimum job acquiring rate for each of the plurality of data entry points, and the workload characteristics for each workload;

a multi-parallelism module configured to determine a software component multi-parallelism recommendation for each of the plurality of software components based on the job throughput benchmark, the processor utilization projection, and the set of workload characteristics for each workload;

a reporting module configured to report the processor utilization projection, the minimum job acquiring rate for each of the plurality of data entry points, and the multi-parallelism recommendation for each of the plurality of software components; and a user interface configured to communicate the job throughput benchmark and the workload characteristics from a user to the benchmark module and communicate the processor utilization projection, the minimum job acquiring rates, and the software component multi-parallelism recommendations to the user.

17. A method for providing enterprise application optimization information for a client, the method comprising:
identifying, by use of a processor a job throughput benchmark for a target system, the target system comprising a processing unit, a plurality of data entry points, each data entry point configured to accept a type of workload, and a plurality of software components;
identifying workload characteristics for a plurality of workloads, each workload associated with one of the data entry points;
executing an optimizing utility configured to:
calculate a minimum job acquiring rate and plurality of expected job arrival rates, the plurality of expected job arrival rates calculated as average arrival rates of each system operating condition for each data entry point based on the workload characteristics of the workloads associated with the data entry point, the minimum job acquiring rate calculated as a maximum of the plurality of expected job arrival rates for each of the plurality of data entry points;
determine a processor utilization projection based on the job throughput benchmark, the expected job arrival rate for each of the plurality of data entry points, the minimum job acquiring rate for each of the plurality of data entry points, and the workload characteristics for each workload;
determine a multi-parallelism recommendation for each of the plurality of software components based the job throughput benchmark, the processor utilization projection, and the set of workload characteristics for each workload; and
report the processor utilization projection, the minimum job acquiring rate, and the multi-parallelism recommendations.

18. The method of claim 17, wherein the workload characteristics for each workload comprise an execution time window, a workload arrival rate, an average complexity value, a software component usage list, and a throughput confidence value.

19. The method of claim 17, wherein the optimizing utility further comprises changing a job acquiring rate for one of the plurality of data entry points to a value based on the minimum job acquiring rate calculated for that data entry point.

20. The method of claim 17 wherein the optimizing utility further comprises changing a multi-parallelism value for one of the software components to a value based on the multi-parallelism recommendation determined for that software component.

21. The method of claim 17, further comprising reporting a plurality of time windows, wherein each time window comprises the time between a beginning time and an ending time such that the enterprise application completes processing of the workload within the time boundaries of the beginning time and the ending time.

22. The method of claim 21, further comprising reporting a plurality of processor utilization projections, wherein each processor utilization projection corresponds to one of the plurality of time windows.

23. The method of claim 21, further comprising reporting a plurality of minimum job acquiring rates, wherein each job acquiring rate corresponds to one of the plurality of time windows.

24. The method of claim 21, further comprising reporting a plurality of multi-parallelism recommendations, wherein each multi-parallelism recommendation corresponds to one of the plurality of time windows.

25. A computer program product comprising computer executable code stored on a storage device and executed by a processor to perform operations to provide enterprise application workload performance information, the operations comprising:
receiving a job throughput benchmark relating to an enterprise application having a plurality of data entry points and a plurality of software components, wherein each data entry point serves at least one workload of a workload type;
receiving a set of workload characteristics relating to each workload;
calculating a plurality of expected job arrival rates as average arrival rates of each system operating condition for each data entry point based on the workload characteristics of the workloads associated with the data entry point;
calculating a minimum job acquiring rate as a maximum of the plurality of expected job arrival rates for each data entry point;
determining a processor utilization projection based on the job throughput benchmark, the expected job arrival rate for each of the plurality of data entry points, the minimum job acquiring rate for each of the plurality of data entry points, and the set of workload characteristics for each workload; and
determining a software component multi-parallelism recommendation for each of the plurality of software components based on the job throughput benchmark, the processor utilization projection, and the expected job arrival rate for each workload.

26. The computer program product of claim 25, the operations further comprising reporting the processor utilization projection, the minimum job acquiring rate, and the software component multi-parallelism recommendations.

27. The computer program product of claim 25, wherein the workload characteristics relating to each workload comprise a workload type, a workload arrival rate, an average complexity value, a workload software component usage list, a throughput confidence value, and a system operating condition defined such that the related workload executes while the system operating condition is satisfied.

28. The computer program product of claim 27, wherein the job throughput benchmark comprises a processing time value of a benchmark job and the average complexity value comprises an expected processing time value of a workload job relative the processing time value of the benchmark job.

29. The computer program product of claim 27, the operations further comprising calculating an expected burst job arrival rate by applying the workload arrival rate, and the throughput confidence value in a manner consistent with a cumulative Poisson distribution to derive the expected burst job arrival rate for workloads of randomly timed origins.

30. The computer program product of claim 29, wherein calculating the expected burst job arrival rate comprises applying the workload arrival rate, and the throughput confidence value in a manner consistent with a cumulative Poisson distribution to derive the expected burst job arrival rate for workloads of randomly timed origins.

31. The computer program product of claim 30, wherein determining the software component multi-parallelism recommendation further comprises applying the expected job arrival rate, the job throughput benchmark, and the processor utilization projection in a manner consistent with Little's Law to determine a multi-parallelism value required for at least one software component to service all workloads which use the at least one software component.

32. The computer program product of claim 25, wherein the workload type is selected from a group consisting of a batch-triggered workload type, a call-triggered workload type, and an event-triggered workload type.

33. The computer program product of claim 25, wherein each system operating condition identifies which workloads are active in response to satisfaction of the system operating condition.

34. The computer program product of claim 33, wherein each system operating condition is selected from a group including a time window, a geographical location, a currently selected client, a current manufacturing process, a control flag, and combinations thereof.

35. The computer program product of claim 25, wherein receiving the set of workload characteristics comprises an operation selected from the group consisting of probing the enterprise application for workload characteristics, retrieving the workload characteristics from a stored data source, and receiving user-entered workload characteristics.

36. The computer program product of claim 25, the job throughput benchmark comprising a number of standard complexity processing jobs that can be processed within a desired time period, and wherein receiving the job throughput benchmark comprises an operation selected from the group consisting of probing the enterprise application for the job throughput benchmark, retrieving the job throughput benchmark from a stored data source, and receiving a user-entered job throughput benchmark.

37. The computer program product of claim 25, the operations further comprising changing a software component multi-parallelism value for a first software component based on the software component multi-parallelism recommendation.

* * * * *